March 3, 1953 R. M. CARRIER, JR., ET AL 2,630,211
SHAKER CONVEYER
Filed Jan. 4, 1950 4 Sheets-Sheet 1
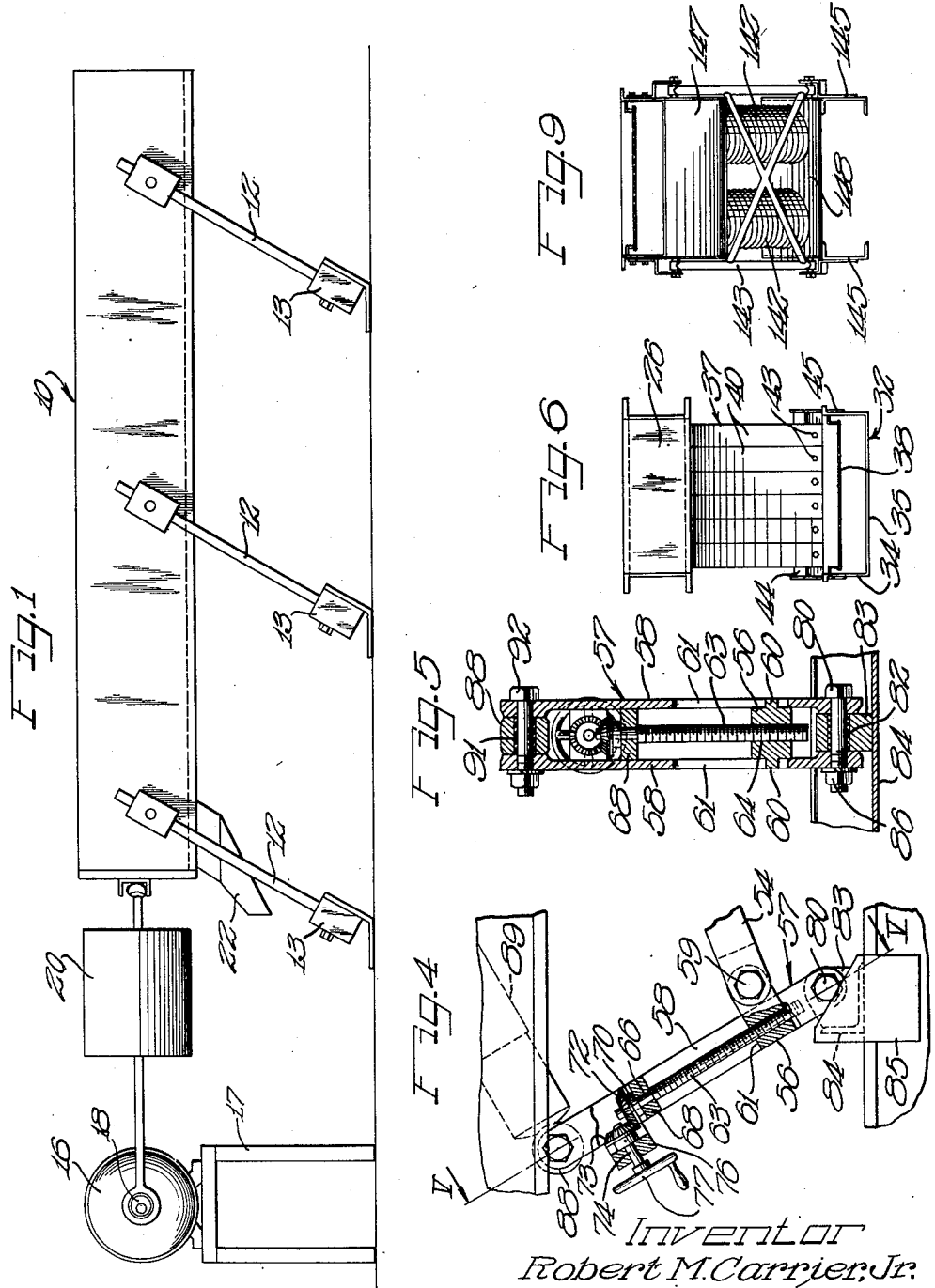
Inventor
Robert M. Carrier, Jr.
Maurice G. Whitley
By The firm of Charles M. Willis
Attys March 3, 1953 R. M. CARRIER, JR., ET AL 2,630,211
SHAKER CONVEYER
Filed Jan. 4, 1950 4 Sheets-Sheet 2
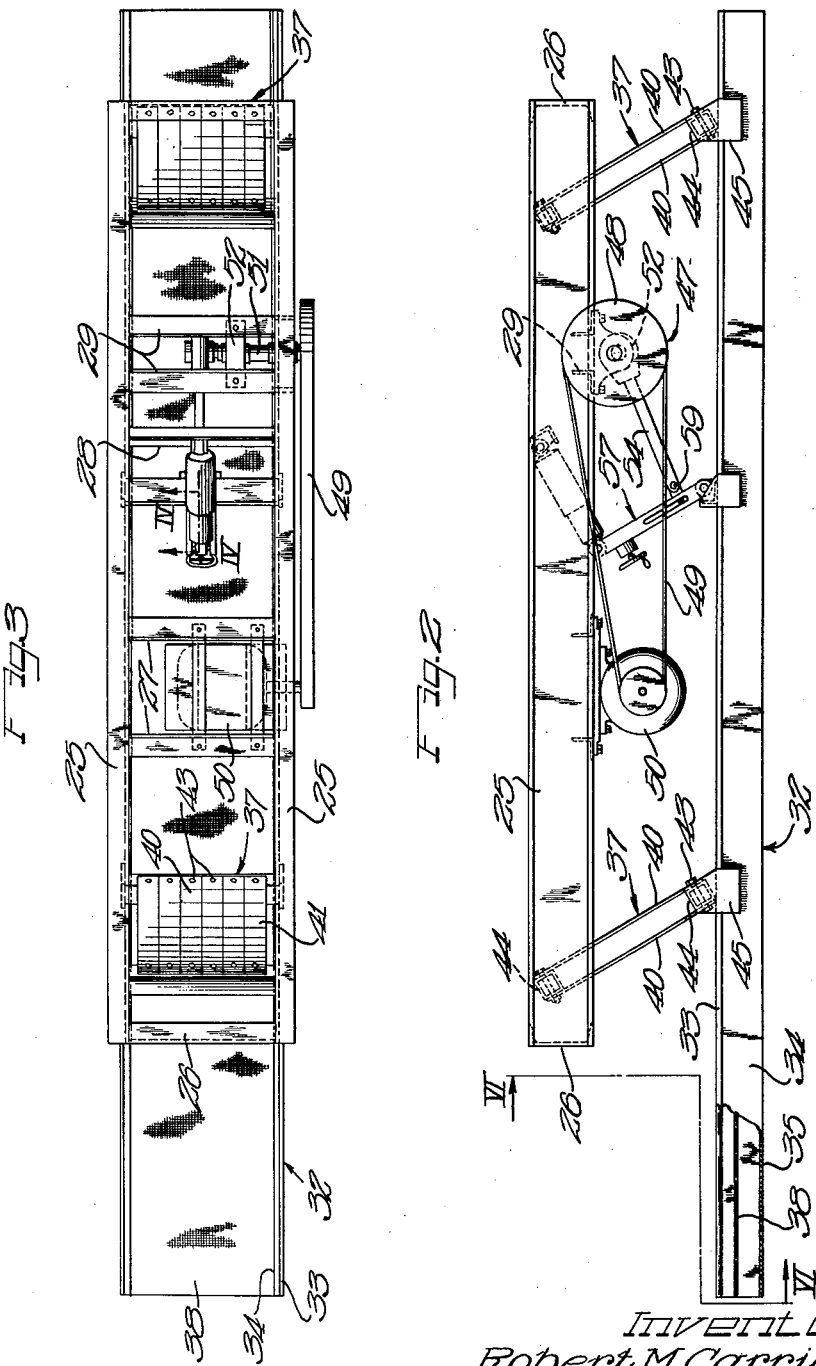
Inventor
Robert M. Carrier, Jr.
Maurice G. Whitley
Attys

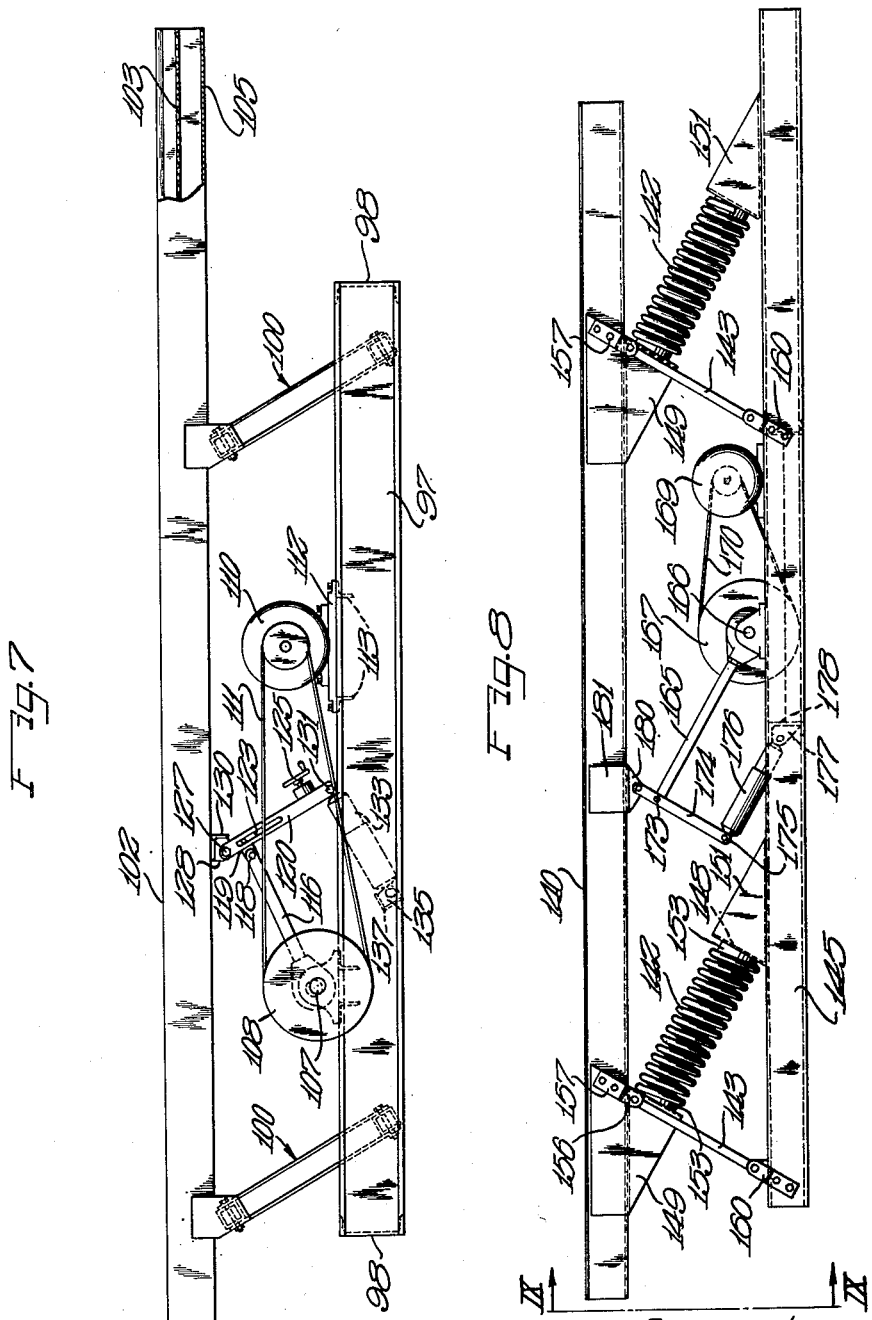

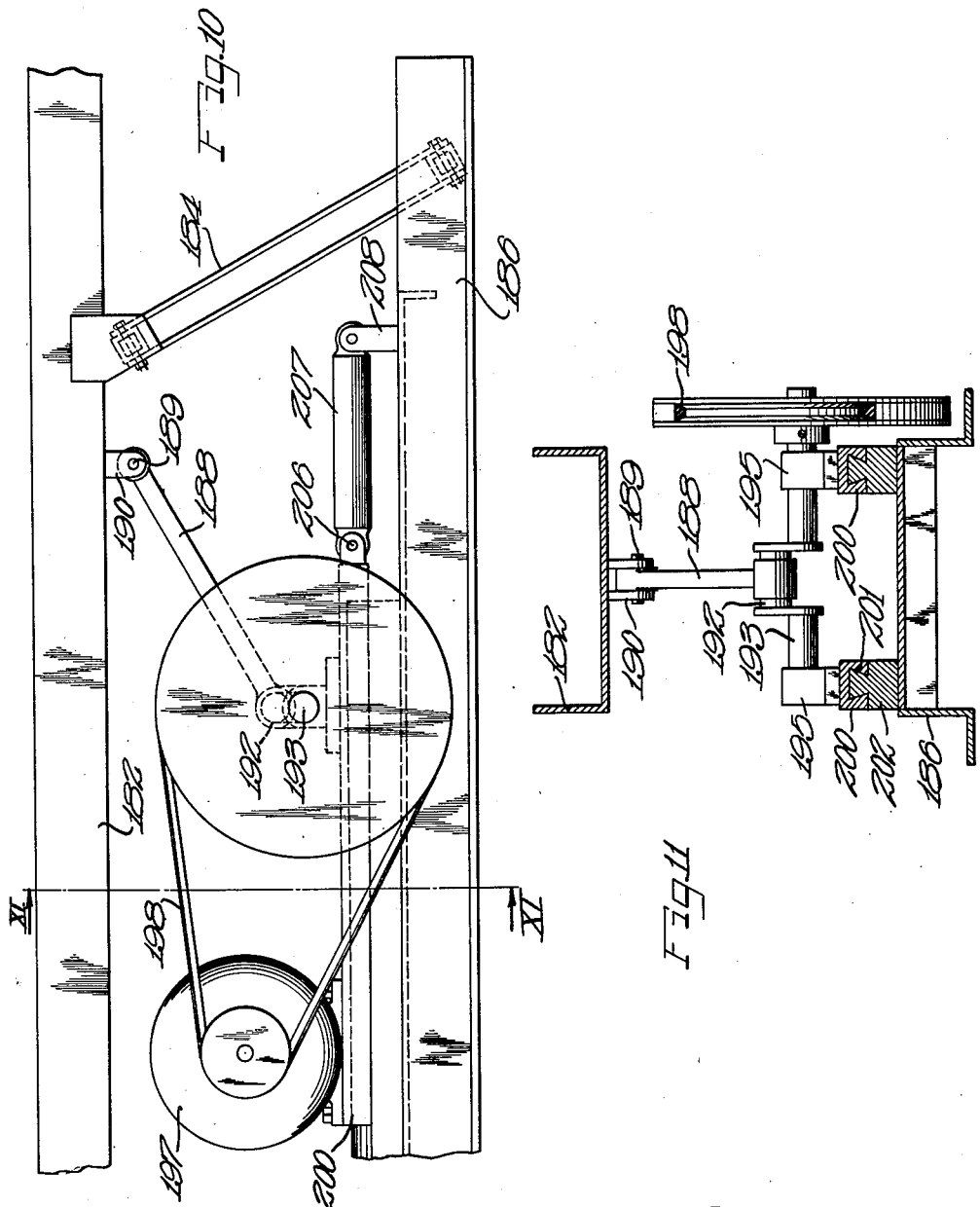

Patented Mar. 3, 1953

2,630,211

UNITED STATES PATENT OFFICE 2,630,211

SHAKER CONVEYER

Robert M. Carrier, Jr., and Maurice G. Whitley, Louisville, Ky., assignors, by mesne assignments, to Carrier Conveyor Corporation, Louisville, Ky., a corporation of Kentucky Application January 4, 1950, Serial No. 136,794

12 Claims. (Cl. 198—220)

This invention relates to improved conveyor apparatus. More particularly, it has to do with an improved spring mounted trough conveyor and means for automatically synchronizing the drive mechanism of the conveyor with the natural frequency of the spring mounting to obtain motivation of the conveyor with minimum power consumption.

The present application is a continuation-in-part of our copending application U. S. Serial No. 11,998, filed February 28, 1948. In the parent application there is described and claimed a novel, natural frequency conveyor in which a link, which is rigid during the operation of the conveyor, maintains a fixed speed relationship between the drive means and the conveyor surface during the operation of the conveyor.

It is an important object of the present invention to provide a conveyor having a novel fluid cylinder link between the conveyor and the drive mechanism permitting automatic adjustment of the effective length of the drive mechanism.

Another object of this invention is to provide an adjusting mechanism for the drive linkage of a conveyor whereby the length of stroke of the conveyor may be regulated easily during the operation of the conveyor.

Another object of this invention is to provide a novel spring mounting for a conveyor which will eliminate fatigue failures of the conveyor pan surface.

A still further object of this invention is to provide a novel conveyor of the trough type which is adapted for mounting from a ceiling support member.

According to the principles of the present invention there is provided a conveying surface in the form of a trough supported from a rigid, immovable base by a novel, parallelogram spring mounting. A power driven eccentric drive mechanism mounted on the base is connected to a drive linkage to oscillate the trough in frequency with the natural frequency of the spring mounting and in an arcuate reciprocating path causing material to be moved along the trough on the directional throw principle. A manually operable adjusting screw is connected in the linkage to vary the stroke of the conveyor while it is operating.

In one embodiment shock absorbers are connected in the drive linkage to aid the machine in starting and stopping; to allow the conveyor to settle slightly from empty to full conveyed load; and to guarantee that no weight is transferred back to eccentric drive. The shock absorber is mounted at the end of a lever in such a manner that it will absorb the load without noticeable movement between its telescoping parts during operation of the conveyor. This relatively stationary operation of the shock absorber prevents the agitation of the liquid therein while at the same time performing its required function.

When appearing hereinafter in this specification, the term "conveyor" will be used in its generic sense to include all typical conveyor installations including those with solid conveying surfaces as well as those having perforated surfaces such as screen conveyors.

Other and further features, objects and advantages of the present invention will be apparent to one skilled in the art from the following detailed description taken in connection with the accompanying drawings.

On the drawings:

Figure 1 is a side elevational view of a trough conveyor constructed according to the principles of this invention;

Figure 2 is a side elevation of a second embodiment of the trough conveyor of this invention showing a form adapted for mounting from a ceiling;

Figure 3 is a top plan view of the conveyor of Figure 2;

Figure 4 is a fragmentary vertical sectional view taken substantially on line IV—IV of Figure 3;

Figure 5 is a fragmentary vertical sectional view taken on line V—V of Figure 4;

Figure 6 is an end elevational view of the conveyor of Figure 2;

Figure 7 is a side elevational view of a third embodiment of the trough conveyor of this invention showing a floor mounted installation;

Figure 8 is a side elevational view of a fourth embodiment of the present invention showing a modified spring mounting for the conveyor;

Figure 9 is an end elevational view of the conveyor of Figure 8.

Figure 10 is a side elevational view of a fifth embodiment of the present invention.

Figure 11 is a vertical sectional view taken on line XI—XI of Figure 10.

As shown on the drawings:

In Figure 1, the reference numeral 10 indicates a trough conveying member mounted substantially horizontally on spring rods 12 which are adjustably secured in blocks 13 on both sides of the trough. An electric motor 16 which is suitably mounted, as on platform 17, operates an eccentric 18 to reciprocate the trough in a substantially horizontal direction through a fluid cylinder 20.

The cylinder 20 may suitably include a piston (not shown) which will automatically shift inside the cylinder to accommodate settling of the conveyor trough on the spring mounting. This cylinder has the property of slowly adjusting its length to accommodate varying loads on the trough while, at the same time, affording a rigid drive link between the drive motor and the conveying surface during the operation of the conveyor.

Such a slow automatic settling action can of course be accomplished through mechanical devices such as a friction link, an inertia link, a centrifugal link, or a magnetic link.

Horizontal reciprocation of the conveyor will result in the movement of the conveyor at an angle upwardly to the left as seen in Figure 1 for discharging the material through a chute 22 secured in an opening in the bottom of the conveyor.

Thus, in Figure 1 a simple trough conveyor is illustrated. It will be understood of course that this conveyor is adapted to be driven by the electric motor 16 at the natural frequency of the spring mounting in accordance with the principle of operation completely disclosed in our parent application, Serial No. 11,998.

In Figures 2 to 7, inclusive, is illustrated a second embodiment of the trough conveyor of this invention. This conveyor is especially designed for mounting from a ceiling support structure such as the spaced channel members 25 which are connected at either end by the transverse channels 26 and intermediate the ends by the transverse angle members 27, 28 and 29.

A conveyor trough 32, having an upper flanged side edge 33, solid side walls 34, and a solid conveying surface 35 is suspended from the ceiling support by parallelogram spring mountings 37. A conveying screen 38 may be supported between the side walls of the trough by any suitable means in spaced relation above the solid conveying surface 35. It will be understood that the separate conveying surfaces 35 and 38 can be arranged to deliver material to different chutes so that the screened material will be delivered to one station while the screenings may be delivered to another station.

The parallelogram spring mountings 37 each include spaced parallel spring assemblies 40. Each spring assembly 40 includes a plurality of separate spring members 41, Figure 3. secured at their ends by bolts 43 to a square tube 44. The tube 44 at the upper end of the spring assembly is welded between the side walls of the channels 25 while the tube at the lower end is welded between upright plate members 45 which are in turn welded to the side walls of the conveyor trough. Each spring assembly 40 could, of course, be made of a single flat spring of a width to extend entirely across the conveyor. The use of a multiplicity of spring members 41 lends itself more readily to variations in the conveyor size.

As seen above each spring mounting is a parallelogram with the parallel spring assemblies 40 forming one pair of opposite sides and the transverse tubes 44 forming the other parallel sides. In operation, the tubes at the lower end will move with the flexing lower end of the spring members 41. In this movement however the angle between the tubes 44 and the frame of the conveyor will not change. Thus, no twisting movements will be delivered to the conveyor trough as in conveyors furnished heretofore. The tubes 44 are subjected to a twisting action but they are relatively short and very strong and can withstand this stress. With this spring mounting the conveyor trough itself can be made of a relatively light construction.

The conveyor trough 32 is reciprocated by means of a drive mechanism 47 including a pulley wheel 48 driven by a belt 49 from a motor 50. The pulley wheel 48 is keyed to a crank shaft 51 that is journalled in a bearing 52 connected to the cross angle members 29. A crank arm 54 has one end connected on the throw of the crankshaft 51 and the other end pivotally connected to a sliding block 56 (Figures 4 and 5) that is disposed between spaced arm members 58 for sliding movement longitudinally of the arms. This pivotal connection is made by means of a pivot pin 59 which is surrounded by a rubber bushing (not shown). The block 56 has lateral extensions 60 that fit into opposed slots 61 in the arms 58.

A feed screw 63 is engaged in a threaded longitudinal opening 64 in the block 56 in such a manner that rotation of the screw will cause the block to move up and down in the composite lever arm 57 formed by the arms 58. The screw 63 has a reduced portion 66 journalled in an opening in a guide block 68 that is rigidly connected between the arms 58. A collar 70 is pinned to the screw 63 above the block 68 together with a beveled gear 72 which is in mesh with a beveled gear 73 that is keyed to a shaft 74. The shaft is journaled in a bracket 76 and is provided with a hand wheel 77. It will be readily seen that rotation of the hand wheel 77 causes rotation of the screw 63 and movement of the block 56 up and down longitudinally of the arms 58 to vary the point of connection of the crank arms 54 with the arms 58.

Referring to Figures 4 and 5, it will be seen that the composite link 57 formed by the arms 58 is pivotally mounted at its lower end on a bolt 80 that passes through the arms 58 and through a rubber bushing 82 disposed in an opening in an upright flange 83. The flange 83 may be secured, as by welding to an angle member 84 that is welded between upright plates 85 extending above the sides of the trough. A nut 86 is threaded on the bolt 80 for drawing the arms 58 toward the flange 83.

At their upper ends, the arms 58 are disposed on either side of an end connector 88 of a fluid cylinder 89 which, in this modification, takes the form of a direct acting or telescoping shock absorber. The connector 88 is provided with a rubber bushing 91 through which a bolt 92 passes. The bolt 92 pivotally connects the composite lever 57 formed by the arms 58 to the ends of the shock absorber 89.

It is to be particularly noted that the shock absorber is connected to the composite link 57 at a much greater distance from the conveyor trough 32 than is the crank arm 54. Thus, the movement of the end of the shock absorber will be much less than the movement of the crank arm. In a typical installation there is no noticeable relative movement of the telescoping parts of the shock absorber while the conveyor is delivering material with a length of stroke of one inch.

The shock absorber 89 has the ability to slowly expand and contract under changes in loading of the conveyor trough. However, when the conveyor is operating, the shock absorber acts as a substantially rigid link.

From the foregoing description it will be seen that in the modification of this invention shown in Figures 2-6, inclusive, there is provided a simple trough conveyor that is driven by the motor 50 through an adjustable linkage and a shock absorber 89. Since the lever system can be changed at will, one size of shock absorber can be used for a wide load range. Further, the screw mechanism for changing the length of the levers provides a convenient efficient means for varying the length of stroke of the conveyor trough since the closer the pivotal connection of the crank arm 54 is to the pivotal connection of the shock absorber 59, the longer will be the stroke of the conveyor and vice versa.

The novel parallelogram spring mounting featured in this modification eliminates the possibility of fractures in the conveyor trough due to the twisting during the reciprocating movements of the trough.

It will, of course, be recognized that the conveyor of Figures 2-6, inclusive, may also be operated according to the natural frequency principle disclosed in the parent application Serial No. 11,998. Further, it is seen that the shock absorber in this modification takes the place of the fluid cylinder 20 of the trough conveyor of Figure 1.

In Figure 7 is shown a third embodiment of the trough conveyor of the present invention. This embodiment is substantially identical to that illustrated in Figure 2 with the exception that this conveyor is adapted for mounting from a rigid floor support, as for example a pair of spaced channel members 97, suitably secured together by end channel members 98. A parallelogram type spring suspension 100 is connected between the trough 102 and the support member 97 exactly as was described in connection with the conveyor of Figure 2. Similarly the trough 102 contains an upper screening conveyor surface 103 and a lower solid or imperforate surface 105.

The conveyor trough 102 is driven by a crankshaft 107 keyed to a pulley 108 which is rotated by an electric motor 110 through a belt or pulley 111. The motor 110 may be mounted on a suitable support 112 secured on angle members 113 which extend between the support channels 97. A crank arm 116 is disposed around the throw of the crankshaft 107 at one end and is pivotally connected as at 118 to a block 119 that is slidably disposed in a composite link or lever 120. The block 119 is slidable in a slot 123 in the composite link 120. This block, and consequently the crank arm 116, may be adjusted up and down between the arms of the lever 120 by means of a hand crank 125 which is connected by a screw means identical to that shown in Figures 4 and 5.

At its upper end the lever 120 is pivotally connected by a bolt 127 to a flange 128 mounted substantially centrally on a cross angle member 130 which extends across the lower surface of the conveying trough 102. At its lower end the lever 120 is pivotally connected by a bolt 131 to a shock absorber 133 which in turn is pivotally connected on a flange 135. The flange 135 is secured in an upright position on an angle member 137 which is secured, as by welding at either end, between the channel members 97.

A fourth embodiment of the present invention is shown in Figure 8. This embodiment comprises a conveyor trough 140 which is resiliently supported by coil springs 142 and pivoting levers 143 from a rigid base structure 145.

As best seen in Figure 9, in a preferred embodiment, two coil springs are disposed between slanted plates 147 and 148. The plate 147 is connected at marginal edges to flange plates 149, Figure 8, which are secured as by welding to the side of the conveyor and extend therebelow. The transverse plate 148 is secured to plates 151 which are mounted in an upright position on the spaced members of the support base 145. Substantially cylindrical guide members 153 extend outwardly from the plates 147 and 148 to telescope inside the coil and hold it in place during the operation of the conveyor.

An arm 143 is provided on each side of the conveyor and is pivotally connected at its upper end to an offset portion 156 of a bracket 157 which is secured to the plate 149. At its lower end the arm 143 is pivotally connected to a bracket 160 which extends upwardly from the channel members. It will be understood, of course, that each of these pivotal connections may be provided with rubber bushings substantially as shown in Figure 5.

In Figure 8 two sets of the spring mountings are shown spaced at opposite ends of the conveyor trough. It will be obvious that as many spring mounting assemblies may be used as required by the size of the installation and the load to be conveyed.

The conveyor trough 140 is reciprocated by a crank arm 165 which is disposed at one end around the throw of a crankshaft 166 keyed to a pulley 167. An electric motor 169 drives the pulley 167 through a belt or pulley 170.

The crank arm 165 is pivotally connected as by a rubber bushed joint 173 to a link 174 which may suitably be of the composite structure disclosed in Figures 4 and 5. While the pivotal connection 173 of Figure 8 is shown in a fixed position, it will be readily recognized that an adjustable connection such as that disclosed in connection with Figures 5 and 7 could readily be adapted on this modification also.

At its lower end the composite lever 174 is pivotally connected, as by a rubber bushed joint 175 to a fluid cylinder 176 which, in turn, is pivotally connected to a flange 177 extending outwardly from an angle member 178 disposed between the channel members forming the base 145. At its upper end the lever 174 is pivotally connected to a flange 180 that extends downwardly from the base of the conveyor trough. This flange may be connected to the conveyor trough in any suitable manner as, for example, by a strap member 181 which extends around the trough.

It will be understood that the drive mechanism is disposed substantially on the longitudinal center line of the conveyor trough so that a maximum force can be exerted to move the conveyor and at the same time no lateral forces will be transmitted to the conveyor trough. The conveyor of Figures 8 and 9 operates exactly as disclosed in connection with the conveyors of Figures 2 and 6.

In Figure 10 is shown still another modification of the trough conveyor of the present invention. In this embodiment a conveying trough 182 is mounted on a parallelogram type spring mounting 184 which is secured to spaced support members 186. The spring mounting 184 is identical to the parallelogram type spring mountings disclosed heretofore in connection with Figure 2 and as many of these spring mountings may be used in the conveyor as is necessary to support the load being conveyed.

The trough 182 is driven by a crank arm 188 which is pivotally mounted by a pin 189 from spaced depending ear members 190 secured to the lower surface of the trough 182. The other end of the crank arm 188 has a connecting rod end which is disposed over the crank pin 192 of a crankshaft 193 which is journaled in spaced bearing members 195. The crankshaft 193 is driven by a pulley wheel 196 which is powered from an electric motor 197 through the belt 198.

As best seen in Figure 11 the spaced bearing blocks 195 are rigidly secured to sliding blocks 200 which also support the motor 197. The blocks 200 have a dovetail 201 connection with longitudinal ways or track members 202 which are rigidly secured in an upright position on the base 186.

One end of each sliding block 200 is pivotally secured by a pin 206 to one end of a shock absorber 207. The other end of the shock absorber 207 is pivotally secured to an upright post member 208 which is rigidly attached to the base 186.

Referring to Figure 10 it will be seen that if a load is put on the trough it will tend to settle due to the fact that the shock absorber 207 will elongate and permit the sliding blocks to slide along the ways or tracks 202 to accommodate the settling. However, when the conveyor is put into motion the shock absorber will act as a rigid link anchoring the base in place and causing the crankshaft to rotate about its axis to actuate the conveyor trough.

Thus in the modification shown in Figures 10 and 11 there is disclosed a trough conveyor wherein the fluid link or shock absorber is not disposed in the mechanism between the drive means and the conveyor as is shown in Figure 1 but is disposed between the drive means and the rigid stationary frame. This construction is also distinguished from that of Figure 2 since in Figures 2 and 6 the fluid link or shock absorber is connected in an actuating linkage.

From the foregoing description it will be seen that there is provided in this invention several novel trough conveyor structures which are relatively simple in construction but possess several distinct advantages over conveyors which have heretofore been supplied. In particular, the novel parallelogram type spring mounting permits the use of a light weight pan construction without the danger of fatigue failure of the pan due to the twisting stresses set up by the driving mechanism. The novel use of a shock absorber as a fluid link in a leverage system so that the shock absorber is relatively stationary has the important advantage of eliminating the agitation of the fluid in the shock absorber. Further, the novel adjusting mechanism for the lever system whereby the length of stroke of the conveyor may be adjusted even while the conveyor is operating provides an important advance in the conveyor art.

It will be understood that modifications and variations may be effected without departing from the scope of the novel concepts of the present invention.

We claim as our invention:

1. A conveyor comprising a rigid support structure, a trough spaced from said support structure, a spring mounting supporting said trough from said structure, a pair of spaced arm members secured together and pivotally connected at one end to said trough, a fluid link pivotally connected to the other end of said arms and to said structure, a power driven crank arm pivotally connected intermediate the ends of said arms in pivotal, adjustably slidable relation, said crank arms being effective to reciprocate said trough through said arms.

2. A conveyor comprising a support structure, a trough resiliently supported on said structure, a pair of arms secured together and pivotally connected to said trough, a fluid cylinder pivotally connected between said structure and the other ends of said arms, a block slidably disposed between said arms, a power driven reciprocating crank arm pivotally connected to said block, and a manually operable screw member threaded through said block for adjusting the position of said pivotal connection relative to the point of connection of said trough and said arms.

3. In a device of the character described, in combination a resiliently supported body which occupies different vertical positions under different conditions of loading, a lever pivotally secured to said body and by which the latter is oscillated, an eccentric rotating on an axis with respect to which said resiliently supported body is adapted to oscillate, a longitudinally inflexible power supplying link pivotally secured at one end to said lever and by which the force required to oscillate said body is supplied to said lever and which link, at its other end, is secured to said eccentric, and a fulcrum for said lever yieldable under load at a rate of movement which is substantially less than the rate of movement of said lever during the normal frequency of oscillation and amplitude of said lever.

4. The device of claim 3 wherein said body comprises a generally horizontal conveyor trough, guide members confine oscillation of said trough along an inclined path, and coil springs resiliently support said trough, the axes of said coil springs being disposed generally parallel to such inclined path.

5. The device of claim 3 wherein said body comprises a generally horizontal conveyor trough, swingably mounted generally parallel guide arms obliquely disposed relative to said trough and pivotally connected to the latter confine oscillation of said trough along an inclined path, and at least one coil spring resiliently supports said trough, the axis of said coil spring being disposed generally parallel to such inclined path.

6. The device of claim 3 wherein said fulcrum is connected to a fluid link provided with a movable element for displacing a body of substantially incompressible fluid and further provided with bleed means through which the fluid is displaced to permit yielding of said fulcrum at the rate aforesaid.

7. The device of claim 3 wherein one end of a longitudinally extensible and retractible fluid cylinder and piston assembly is secured to said fulcrum and the other end is secured to a pivot with respect to which said fulcrum yields as aforesaid, said assembly when extended and retracted displacing substantially incompressible fluid therein through an orifice of size determining the rate of yielding of said fulcrum.

8. The device of claim 3 wherein means are provided for adjusting the distance between said fulcrum and the point where said link is pivotally secured to said lever.

9. The device of claim 3 wherein said link is pivotally secured to said lever between said fulcrum and the pivotal connection of said lever to said body.

10. The device of claim 3 wherein there is a pivot with respect to which said fulcrum yields as aforesaid and a double acting hydraulic shock absorber is connected between said fulcrum and said pivot for lengthening and shortening and thus controlling the yielding of said fulcrum.

11. In a device of the character described, in combination a resiliently supported body which occupies different vertical positions under different conditions of loading, a lever pivotally secured to said body and by which the latter is oscillated, an eccentric rotating on an axis with respect to which said resiliently supported body is adapted to oscillate, a longitudinally inflexible power supplying link pivotally secured at one end to said lever and by which the force required to oscillate said body is supplied to said lever and which link, at its other end, is secured to said eccentric, and a pivotally supported fulcrum of limited yieldability and capable of substantial displacement, for said lever, the distance on said lever between the point of connection thereof to said body and said fulcrum being substantially greater than the distance between said point of connection and the point of connection to the lever of said link.

12. In a device of the character described, in combination a resiliently supported body which occupies different vertical positions under different conditions of loading, a lever pivotally secured to said body and by which the latter is oscillated, an eccentric rotating on an axis with respect to which said resiliently supported body is adapted to oscillate, a longitudinally inflexible power supplying link pivotally secured at one end to said lever and by which the force required to oscillate said body is supplied to said lever and which link, at its other end, is secured to said eccentric, and a fulcrum for said lever which is yieldable to a substantial extent only under a force which is greater than the force required to oscillate said lever during the normal condition of operation of said device, the distance on said lever between the point of connection thereof to said body and said fulcrum being substantially greater than the distance between said point of connection and the point of connection to the lever of said link.

ROBERT M. CARRIER, Jr.
MAURICE G. WHITLEY.

REFERENCES CITED

The following references are of record in the file of this patent:

UNITED STATES PATENTS

| Number | Name | Date |
| --- | --- | --- |
| 593,743 | Hand | Nov. 16, 1897 |
| 657,393 | Buss | Sept. 4, 1900 |
| 786,337 | Zimmer | Apr. 4, 1905 |
| 1,146,947 | Norton | July 20, 1915 |
| 1,471,763 | Wentz | Oct. 23, 1923 |
| 2,447,393 | Campion | Aug. 17, 1948 |

FOREIGN PATENTS

| Number | Country | Date |
| --- | --- | --- |
| 338,023 | Germany | June 11, 1921 |
| 580,558 | Germany | July 13, 1933 |